US012205742B2

(12) United States Patent
Shiokawa

(10) Patent No.: US 12,205,742 B2
(45) Date of Patent: Jan. 21, 2025

(54) WOUND INDUCTOR COMPONENT

(71) Applicant: Murata Manufacturing Co., Ltd., Kyoto-fu (JP)

(72) Inventor: Noboru Shiokawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 710 days.

(21) Appl. No.: 17/477,487

(22) Filed: Sep. 16, 2021

(65) Prior Publication Data

US 2022/0093312 A1 Mar. 24, 2022

(30) Foreign Application Priority Data

Sep. 18, 2020 (JP) ................................ 2020-157341

(51) Int. Cl.
*H01F 27/28* (2006.01)
*H01F 27/02* (2006.01)
*H01F 27/24* (2006.01)

(52) U.S. Cl.
CPC ............. *H01F 27/02* (2013.01); *H01F 27/24* (2013.01)

(58) Field of Classification Search
CPC ........ H01F 27/02; H01F 27/24; H01F 27/022; H01F 27/2823; H01F 27/292; H01F 17/045; H01F 17/04
USPC .................................................... 336/98, 221
See application file for complete search history.

(56) References Cited

U.S. PATENT DOCUMENTS

2016/0118183 A1* 4/2016 Wada .................... H01F 27/292 336/192
2016/0133377 A1* 5/2016 Takagi .................... H01F 27/29 29/605
2020/0402703 A1* 12/2020 Tanaka .................... H01F 27/29

FOREIGN PATENT DOCUMENTS

| | | | |
|---|---|---|---|
| CN | 108933025 | A | 12/2018 |
| CN | 111540577 | A | 8/2020 |
| CN | 114203388 | A | 3/2022 |
| JP | S57-97918 | U | 6/1982 |
| JP | H10-172832 | A | 6/1998 |
| JP | 10321438 | A | * 12/1998 |
| JP | H10-321438 | A | 12/1998 |
| JP | 2002-353042 | A | 12/2002 |
| JP | 2004-040045 | A | 2/2004 |
| JP | 2011-171544 | A | 9/2011 |

* cited by examiner

*Primary Examiner* — Shawki S Ismail
*Assistant Examiner* — Kazi S Hossain
(74) *Attorney, Agent, or Firm* — Studebaker & Brackett PC

(57) ABSTRACT

In the wound inductor component, a flange is connected to a first end of a winding core in the central axial line direction, and protrudes from both sides of the winding core along a height direction. A cover member covers a portion from the upper end of the flange to the upper end of the winding core from above. In a sectional view including the central axial line and along the height direction, an area of a first region at an upwardly protruding portion of the flange defined by a boundary between the flange and the winding core, a straight line parallel to the central axial line and passing through the upper end of the flange, and a region surrounded by a portion of the surface of the flange is larger than an area of a similarly defined second region at a downwardly protruding portion of the flange.

16 Claims, 6 Drawing Sheets

WOUND INDUCTOR COMPONENT

CROSS-REFERENCE TO RELATED APPLICATION

This application claims benefit of priority to Japanese Patent Application No. 2020-157341 filed Sep. 18, 2020, the entire content of which is incorporated herein by reference.

BACKGROUND

Technical Field

The present disclosure relates to a wound inductor component.

Background Art

The core of the wound inductor component described in Japanese Patent Application Laid-Open No. 2011-171544 includes a columnar winding core. A pair of flanges is connected to both ends of the winding core in the central axial line direction. Each flange protrudes outward from the surface of the winding core in the direction orthogonal to the central axial line. A terminal electrode is provided at a lower end of each flange. A wire is wound around the winding core. The upper surface of the core is covered with a cover member made of epoxy resin. The cover member covers a range from one flange to the other flange in the central axial line direction. That is, the cover member covers the wire wound around the pair of flanges of the core and the winding core from above.

SUMMARY

In the wound inductor component as described in Japanese Patent Application Laid-Open No. 2011-171544, the cover member expands or contracts due to a change in temperature. For example, in a thermal shock test on the assumption of being mounted on a vehicle, since the temperature changes extremely, there is a possibility that the cover member is cracked or the like due to expansion and contraction of the cover member.

Accordingly, one aspect of the present disclosure is a wound inductor component including a columnar winding core; a first flange and a second flange respectively connected to both ends of the winding core in a central axial line direction and protruding from both of opposite sides of the winding core along a first line direction orthogonal to the central axial line direction of the winding core and a surface mounted at the time of mounting, when a line through which a center of the winding core passes in an extending direction of the winding core is defined as a central axial line, and a direction in which the central axial line extends is defined as the central axial line direction; a wire wound around the winding core; and a cover member covering, from one side in the first line direction, a portion from a farthest end on one side of the first flange in the first line direction to the winding core in the first line direction. When viewed in a cross section including the central axial line and along the first line direction, and when a region surrounded by a straight line extending in the first line direction and passing through a boundary between the first flange and the winding core, a straight line parallel to the central axial line and passing through a farthest end on one side of the first flange in the first line direction, and a first portion of an inner surface of the first flange is defined as a first region, and a region surrounded by a straight line extending in the first line direction and passing through a boundary between the first flange and the winding core, a straight line parallel to the central axial line and passing through an end on the other side of the first flange in the first line direction, and a second portion of the inner surface of the first flange is defined as a second region, an area of the first region is larger than an area of the second region.

According to the above configuration, a relatively large space for disposing the cover member is secured at the end on one side of the flange in the first line direction on the side of the winding core, that is, at a location corresponding to the first region. Therefore, at the location corresponding to the first region, the cover member can be provided with a corresponding thickness, and the change in the thickness of the cover member at a portion from the winding core to the flange becomes moderate. Therefore, it is possible to suppress a sudden change in the amount of thermal expansion and thermal contraction of the cover member, and for example, it is possible to suppress damage to the cover member due to thermal expansion and thermal contraction if the cover member is exposed to an extreme temperature change as assuming an in-vehicle level.

Regardless of a thermal shock applying to the cover member of the wound inductor component, the occurrence of damage to the cover member can be suppressed.

DETAILED DESCRIPTION

Figure 1:
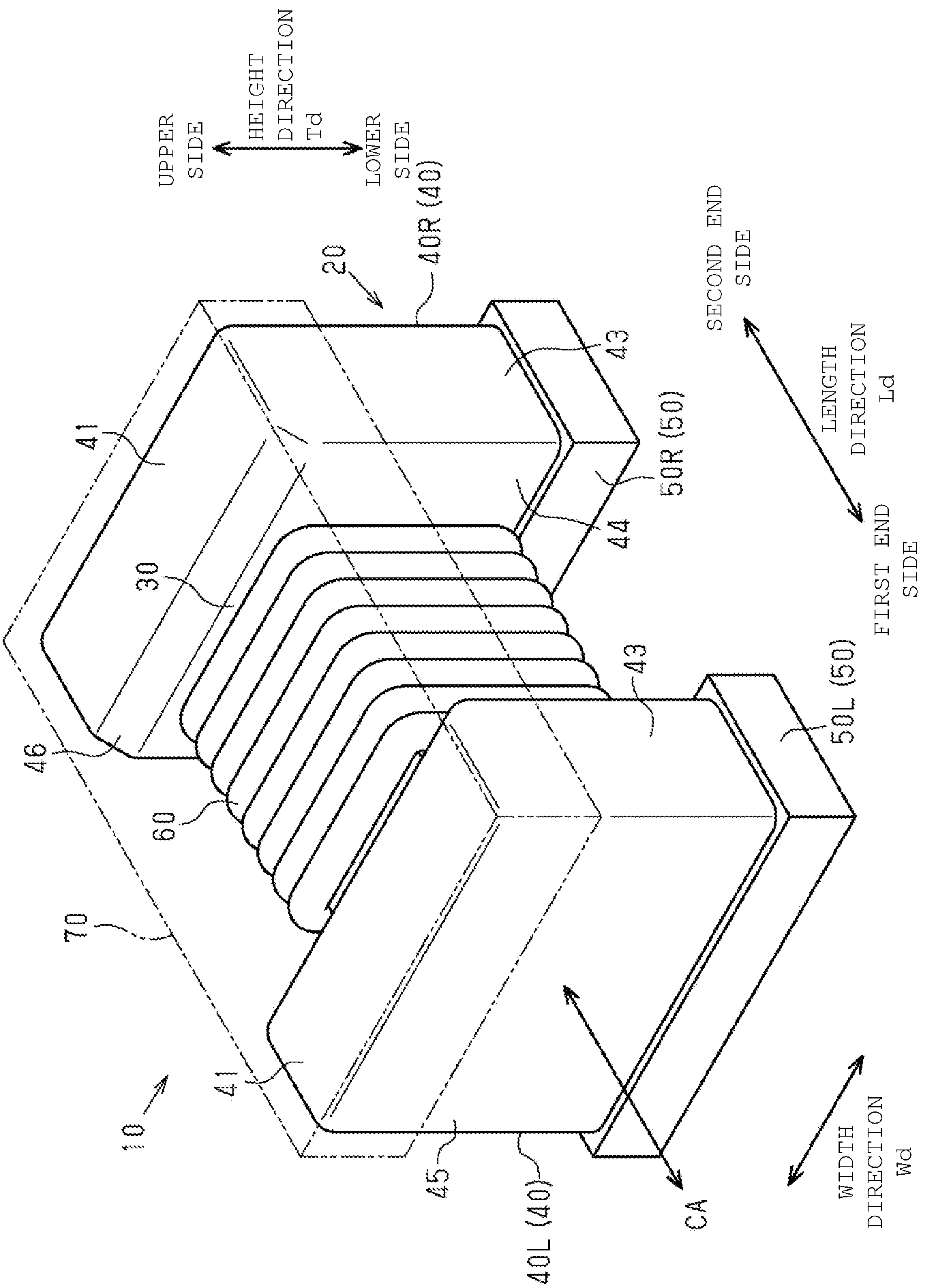
FIG. 1 is a perspective view of a wound inductor component according to a first embodiment.

Hereinafter, each embodiment of a wound inductor component will be described with reference to the drawings. Note that, in the drawings, components may be illustrated in an enlarged manner for easy understanding. The dimensional ratios of the components may be different from the actual ones or those in another drawing.

First Embodiment

First, a first embodiment of a wound inductor component will be described.

As illustrated in FIG. 1, in a wound inductor component 10, a core 20 includes a winding core 30 having a regular quadrangular prism shape and a pair of flanges 40 connected to both ends of the winding core 30 in a central axial line CA direction. The material of the core 20 is a magnetic body such as nickel-zinc ferrite. The core 20 is a sintered body formed by firing a sintered body obtained by compressing a powdery magnetic body.

In the following description, a line through which the center of the winding core 30 passes in the direction in which the winding core 30 extends is defined as the central axial line CA, and the direction in which the central axial line CA extends is defined as a central axial line CA direction. The central axial line CA direction of the winding core 30 is defined as a length direction Ld. In mounting the wound inductor component 10 on a substrate or the like, when a surface facing the substrate or the like is a mounting surface, a direction orthogonal to both the length direction Ld and the mounting surface is defined as a height direction Td. That is, in FIG. 1, the vertical direction is defined as the height direction Td. A direction orthogonal to both the length direction Ld and the height direction Td is defined as a width direction Wd.

The dimension of the winding core 30 in the length direction Ld is 800 μm. The dimension of the winding core 30 in the height direction Td is 400 μm.

A first flange 40L as one of the pair of flanges 40 is connected to a first end of the winding core 30 in the central axial line CA direction. The first flange 40L has a substantially rectangular parallelepiped shape which is flat and has a small dimension in the length direction Ld as a whole. The first flange 40L has a rectangular shape when viewed in the length direction Ld.

Figure 2:
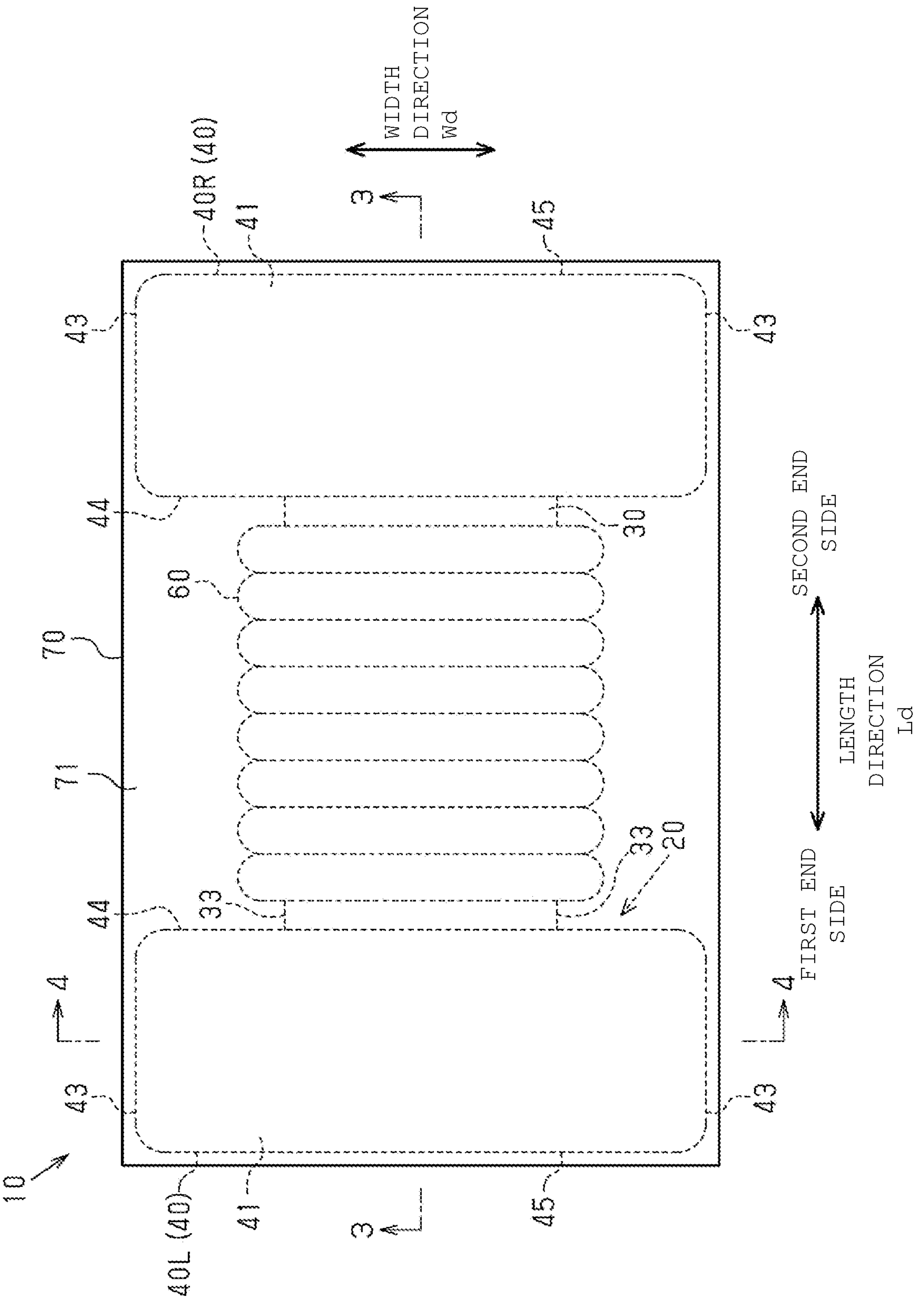
FIG. 2 is a top view of the wound inductor component according to the first embodiment.
Figure 3:
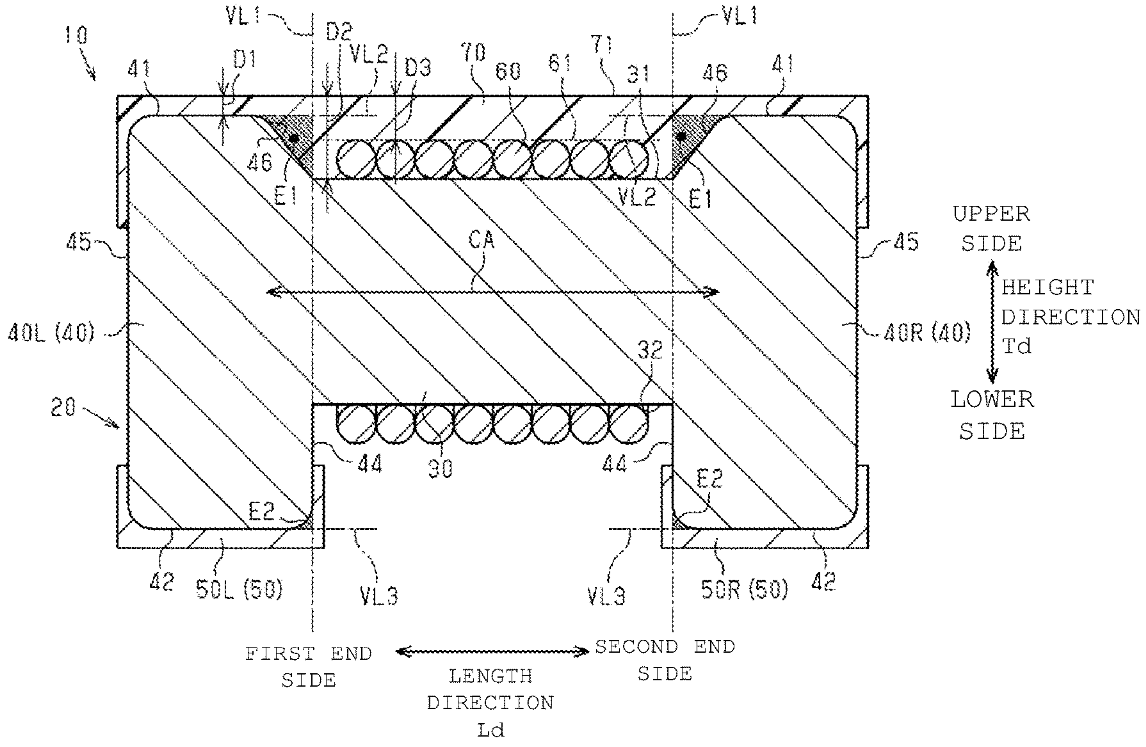
FIG. 3 is a sectional view taken along line 3-3 in FIG. 2.

As illustrated in FIG. 3, an upper end surface 41 which is an upper surface in the height direction Td of the surface of the first flange 40L is parallel to an upper surface 31 which is an upper surface in the height direction Td of the winding core 30. A lower end surface 42 which is a lower surface in the height direction Td of the surface of the first flange 40L is parallel to a lower surface 32 which is a lower surface in the height direction Td of the winding core 30. As illustrated in FIG. 2, lateral surfaces 43 which are surfaces on both sides of the surface of the first flange 40L in the width direction Wd are parallel to lateral surfaces 33 which are surfaces on both sides of the winding core 30 in the width direction Wd. As illustrated in FIG. 3, an inner surface 44 that is an inner surface in the length direction Ld and an outer surface 45 that is an outer surface in the length direction Ld of the surface of the first flange 40L are orthogonal to the length direction Ld.

The dimension of the first flange 40L in the length direction Ld is 400 μm. The dimension of the first flange 40L in the height direction Td is 800 μm. Therefore, the dimension of the first flange 40L in the height direction Td is larger than the dimension of the winding core 30 in the height direction Td. The first flange 40L protrudes from the winding core 30 to both sides in the height direction Td. Therefore, the upper end surface 41 of the first flange 40L is located above the upper surface 31 of the winding core 30. The lower end surface 42 of the first flange 40L is positioned below the lower surface 32 of the winding core 30. In this embodiment, the height direction Td corresponds to a first line direction (e.g., a first line direction). The upper side corresponds to one side in the first line direction.

The amount of protrusion of the first flange 40L from the winding core 30 is smaller on the upper side than on the lower side. In the present embodiment, the distance from the upper end surface 41 of the first flange 40L to the upper surface 31 of the winding core 30 is 130 μm. The distance from the lower end surface 42 of the first flange 40L to the lower surface 32 of the winding core 30 is 270 μm.

As illustrated in FIG. 2, the dimension of the first flange 40L in the width direction Wd is larger than the dimension of the winding core 30 in the width direction Wd. The first flange 40L protrudes from the winding core 30 toward both sides in the width direction Wd. The amount of protrusion of the first flange 40L from the winding core 30 in the width direction Wd is the same on both sides. That is, the central axial line CA passes through the center of the first flange 40L in the width direction Wd.

Figure 4:
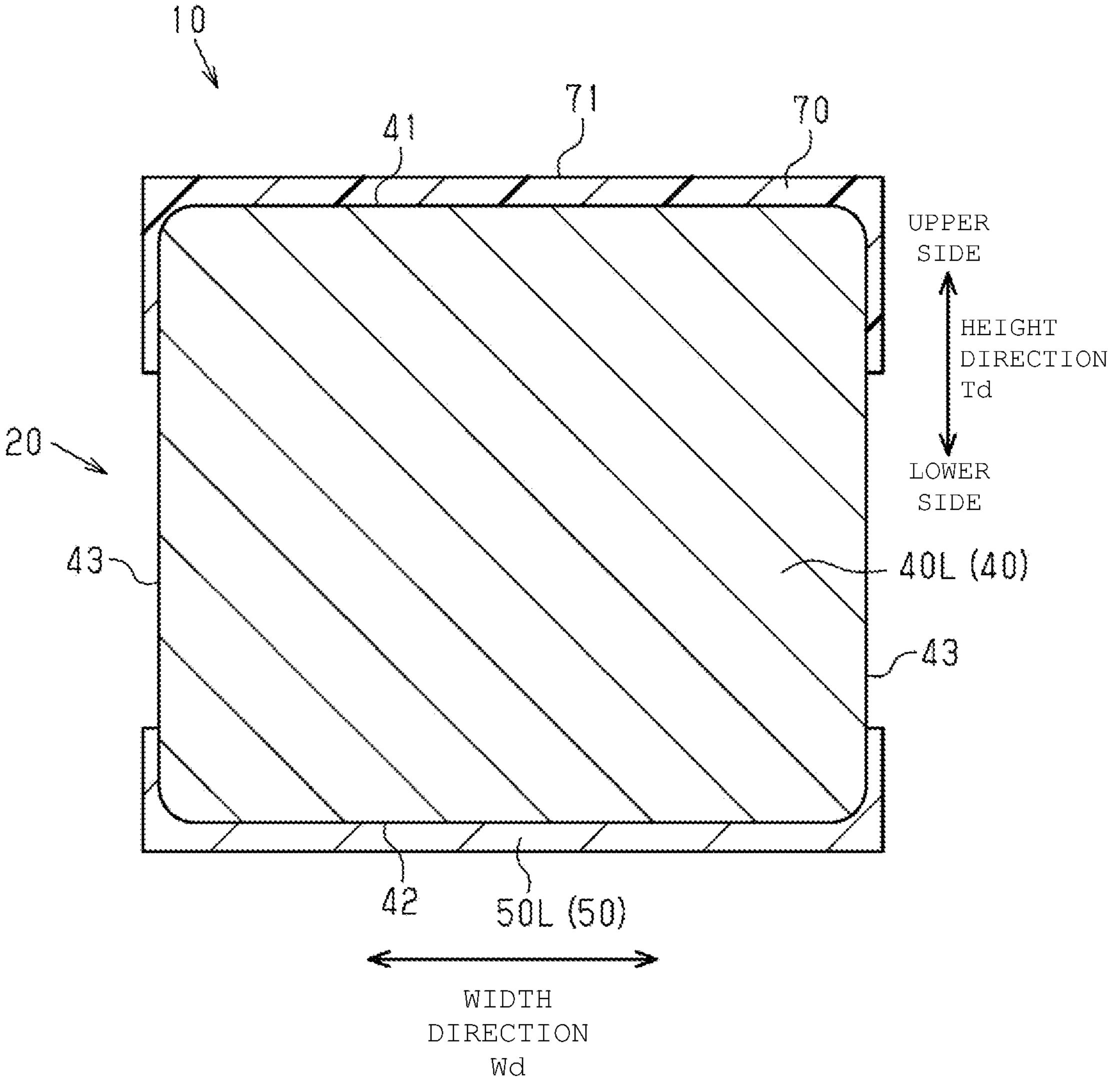
FIG. 4 is a sectional view taken along line 4-4 in FIG. 2.

A boundary portion of each surface constituting the surface of the first flange 40L has a chamfered shape. Specifically, as illustrated in FIG. 2, a boundary portion between the outer surface 45 of the first flange 40L and the both lateral surfaces 43 has a round chamfered shape, that is, an arc shape in a sectional view. As illustrated in FIG. 3, a boundary portion between the outer surface 45 and the upper end surface 41 and a boundary portion between the outer surface 45 and the lower end surface 42 are both formed in a round chamfered shape. As illustrated in FIG. 4, a boundary portion between the both lateral surfaces 43 of the first flange 40L and the upper end surface 41 and a boundary portion between the both lateral surfaces 43 and the lower end surface 42 also have a round chamfered shape. Further, as illustrated in FIG. 2, a boundary portion between the inner surface 44 and the both lateral surfaces 43 of the first flange 40L also has a round chamfered shape, and as illustrated in FIG. 3, a boundary portion between the inner surface 44 and the lower end surface 42 also has a round chamfered shape. The shape of the boundary portion between the inner surface 44 and the upper end surface 41 of the first flange 40L will be described later.

As illustrated in FIG. 1, a second flange 40R as one of the pair of flanges 40 is connected to a second end of the winding core 30 in the central axial line CA direction. The second flange 40R has a symmetrical shape with respect to the first flange 40L on the first end side in the central axial line CA direction. Since the shape of each part of the second flange 40R is the same as that of the first flange 40L, the same reference numerals are given and the description thereof is omitted.

A terminal electrode 50 is provided in a lower portion of each flange 40 in the height direction Td. Specifically, a first terminal electrode SOL is provided in a lower portion of the first flange 40L in the height direction Td. The first terminal electrode SOL covers the entire lower end surface 42 of the first flange 40L. In addition, the first terminal electrode SOL covers a part of the lower side of the outer surface 45 of the first flange 40L, a part of the lower side of both the lateral surfaces 43, and a part of the lower side of the inner surface 44. The upper edge of the first terminal electrode SOL is located below the lower surface 32 of the winding core 30. A second terminal electrode 50R is provided in a lower portion of the second flange 40R in the height direction Td. The second terminal electrode 50R has the same configuration as the first terminal electrode 50L.

A wire 60 is wound around the winding core 30. Therefore, the wire 60 is wound in a spiral shape with the central axial line CA as a winding central axis as a whole. The wire 60 is in direct contact with the surface of the winding core 30. In this embodiment, as illustrated in FIG. 3, the wire 60 is wound in a single layer so as not to overlap in the height direction Td when viewed in a cross section including the central axial line CA and along the height direction Td. Therefore, the upper end of the wire 60 for each round coincides with the position in the height direction Td, and an upper end surface 61 of the wire 60 is a surface connecting the upper end of the wire 60 for each circumference. The portion of the wire 60 wound around the winding core 30 does not reach both the flanges 40 in the length direction Ld. Therefore, a portion around which the wire 60 is not wound exists at both ends of the winding core 30 in the length direction Ld, that is, near the boundary with each flange 40. One end of the wire 60 is connected to the first terminal electrode 50L, and the other end of the wire 60 is connected to the second terminal electrode 50R.

Although not illustrated, the wire 60 has a structure in which wiring made of copper or the like is covered with an insulating film from the outside in the radial direction. In the present embodiment, the diameter of the entire wire 60 including the coating is 85 μm.

The core 20 and the wire 60 are covered with a cover member 70 from above in the height direction Td. The cover member 70 covers the entire upper surface 31 of the winding core 30 and the entire upper end surface 41 of each flange 40. Therefore, the cover member 70 covers a portion from the upper end of the first flange 40L to the upper end of the winding core 30 and a portion from the upper end of the winding core 30 to the upper end of the wire 60 from above. The cover member 70 covers a part of the upper side of both lateral surfaces 33 of the winding core 30, a part of the upper side of both lateral surfaces 43 of the flanges 40, a part of the upper side of both outer surfaces 45 of the flanges 40, and a part of the upper side of the inner surfaces 44 of both flanges 40. The lower edge of the cover member 70 is positioned above the lower surface 32 of the winding core 30. Therefore, the cover member 70 covers a portion from the first flange 40L to the winding core 30 and a portion from the second flange 40R to the winding core 30 from above. Of the surfaces of the core 20 and the wire 60, a portion covered with the cover member 70 is in contact with the cover member 70. In other words, the inside of the cover member 70 is filled with a resin or the like constituting the cover member 70, and covers a part of the surfaces of the core 20 and the wire 60. An upper surface 71 which is an upper surface of the cover member 70 in the height direction Td is a plane parallel to the upper end surface 41 of the first flange 40L. The cover member 70 has an elastic modulus of 120 MPa or less. In the present embodiment, the material of the cover member 70 is an acrylic resin.

The elastic modulus can be measured by using the following apparatus.

Test apparatus: AGSX-5 kN (Shimadzu Corporation)

Measurement conditions: tensile speed 5.0 mm/min

Here, the shape of the boundary portion between the inner surface 44 and the upper end surface 41 of the flange 40 will be described in detail.

As illustrated in FIG. 3, when viewed from the width direction Wd, a corner of the first flange 40L on the upper side in the height direction Td and on the winding core 30 side in the length direction Ld has a shape cut out in a triangular shape.

Specifically, on the surface of the first flange 40L, the upper end surface 41 and the inner surface 44 are connected by a covered surface 46. The covered surface 46 is inclined so as to be positioned on the lower side in the height direction Td toward the winding core 30 in the length direction Ld. In the present embodiment, when viewed in a cross section including the central axial line CA and along the height direction Td, the covered surface 46 extends linearly inclined with respect to both the height direction Td and the length direction Ld. The covered surface 46 is linear in a range of 100 μm including the end of the first flange 40L on the winding core 30 side in the length direction Ld. That is, the range of the covered surface 46 in the length direction Ld is less than or equal to half the dimension of the first flange 40L in the length direction Ld.

Here, as illustrated in FIG. 3, a straight line extending in the height direction Td and passing through the boundary between the winding core 30 and the first flange 40L when the core 20 is viewed in a cross section including the central axial line CA and along the height direction Td is defined as a first virtual straight line VL1. In the present embodiment, the first virtual straight line VL1 extends along the inner surface 44. In the first flange 40L, a straight line extending in parallel with the central axial line CA and passing through the upper end surface 41 when viewed in a cross section including the central axial line CA and along the height direction Td is defined as a second virtual straight line VL2. In the present embodiment, the second virtual straight line VL2 extends along the upper end surface 41. Further, in the first flange 40L, a straight line extending parallel to the central axial line CA and passing through the lower end surface 42 when viewed in a cross section including the central axial line CA and along the height direction Td is defined as a third virtual straight line VL3. In the present embodiment, the area of the first region E1 surrounded by the surfaces of the first virtual straight line VL1, the second virtual straight line VL2, and the first flange 40L is larger than the area of the second region E2 surrounded by the surfaces of the first virtual straight line VL1, the third virtual straight line VL3, and the first flange 40L. Similarly, also in the second flange 40R, the area of the first region E1 is larger than the area of the second region E2.

As illustrated in FIG. 3, in a sectional view along the height direction Td including the central axial line CA of the wound inductor component 10, an average distance in the height direction Td from the upper end of the first flange 40L to the upper surface of the surface of the cover member 70 is defined as a first average distance D1. In the present embodiment, the upper end of the first flange 40L is the upper end surface 41 that is a plane parallel to the central axial line CA. The upper surface of the surface of the cover member 70 is the upper surface 71. Therefore, the first average distance D1 is an average distance in the height direction Td from the upper end surface 41 of the first flange 40L to the upper surface 71 of the cover member 70, and is specifically 40 μm. In a sectional view along the height direction Td including the central axial line CA of the wound inductor component 10, a second average distance D2 in the height direction Td from the upper surface 31 of the winding core 30 to the upper surface 71 of the cover member 70 is 170 μm. Further, in a sectional view along the height direction Td including the central axial line CA of the wound inductor component 10, an average distance in the height direction Td from the upper end of the wire 60 to the upper surface of the surface of the cover member 70 is defined as a third average distance D3. In the present embodiment, the position of the upper end of the wire 60 in the height direction Td is the position of the upper end surface 61 of the wire 60. Therefore, the third average distance D3 is a distance in the height direction Td from the upper end surface 61 of the wire 60 to the upper surface 71 of the cover member 70, and is specifically 85 μm. Note that each average distance is determined as an average value of three measured values obtained by measuring a distance in the height direction Td from each upper end to the upper surface 71 of the cover member 70 at three points in one observation field obtained by microscopically observing a cross section including the central axial line CA and extending along the height direction Td at a magnification of 300 times or performing measurement by microscopic observation three times. Similarly, the average distance in the second flange 40R has the same value as that of the first flange 40L.

Next, the operation of the first embodiment will be described.

When the wire 60 of the wound inductor component 10 is energized, the temperature of the cover member 70 increases by being transmitted to the cover member 70 generated by the energization. At this time, the cover member 70 is thermally expanded. The thickness of the cover member 70 in the height direction Td is thin on the upper end surface 41 of the flange 40 and thick on the winding core 30. In the portion where the thickness of the cover member 70 is changed in this manner, a load is likely to be applied to the cover member 70 along with the temperature change due to the difference in the thermal expansion amount. In particular, since the material of the cover member 70 in the present embodiment is an acrylic resin having a relatively low elastic modulus, it is possible to prevent damage due to thermal expansion and compression of the substrate on which the wound inductor component 10 is mounted and the core 20 at the time of thermal shock, but the thermal expansion amount is correspondingly large. Therefore, the load applied to the cover member 70 becomes correspondingly large.

Next, effects of the first embodiment will be described.

(1-1) According to the first embodiment, since the area of the first region E1 is larger than the area of the second region E2, a relatively large space for disposing the cover member 70 is secured in a portion corresponding to the first region E1. Then, at a location corresponding to the first region E1, the change in the thickness of the cover member 70 in the length direction Ld becomes gentle as compared with the case where the cover member is provided in a location corresponding to the second region E2. By making the change in the thickness of the cover member 70 gentle in this manner, it is possible to suppress a rapid change in the amount of thermal expansion, and it is possible to suppress damage to the cover member 70 due to thermal expansion when, for example, excessive thermal shock is applied to the cover member 70 as assuming an in-vehicle level.

(1-2) According to the first embodiment, the covered surface 46 of the first flange 40L is linear when viewed in a cross section including the central axial line CA and along the height direction Td. Therefore, the covered surface 46 can be formed by linearly cutting the boundary portion between the upper end surface 41 and the inner surface 44 of the first flange 40L, and complicated processing is not necessarily required.

(1-3) In the first embodiment, the material of the cover member 70 is an acrylic resin. The elastic modulus of the acrylic resin is relatively low. Therefore, damage due to thermal expansion and compression between the substrate on which the wound inductor component 10 is mounted and the core 20 can be prevented.

(1-4) In the first embodiment, the upper end surface 41 of the first flange 40L is an upper end in the height direction Td. That is, the upper end of the first flange 40L is a plane orthogonal to the height direction Td. Therefore, the thickness of the cover member 70 is uniform within a corresponding range. If the upper surface of the first flange 40L has irregularities, stress may be applied to portions having different thicknesses of the cover member 70 due to thermal expansion and compression, but in the first embodiment, such stress is not applied. As a result, damage when a thermal shock is applied to the cover member 70 can be suppressed in a wider range. [0044](1-5) According to the first embodiment, in a sectional view along the height direction Td including the central axial line CA of the wound inductor component 10, the first average distance D1 in the height direction Td from the upper end surface 41 of the first flange 40L to the upper surface 71 of the cover member 70 is 40 μm. In a sectional view along the height direction Td including the central axial line CA of the wound inductor component 10, a second average distance D2 in the height direction Td from the upper surface 31 of the winding core 30 to the upper surface 71 of the cover member 70 is 170 μm. Therefore, the first average distance D1 is from 20% to 45% of the second average distance D2. That is, the difference between the first average distance D1, which is the thickness of the portion of the cover member 70 covering the flange 40, and the second average distance D2, which is the thickness of the portion covering the winding core 30, is not excessively large. Therefore, regardless of thermal expansion or contraction of the cover member 70, the difference in the amount of expansion or contraction between the portion of the cover member 70 covering the flange 40 and the portion covering the winding core 30 does not become excessively large. As a result, regardless of an excessive thermal shock applying to the cover member 70, it is possible to suppress occurrence of damage starting from a place where the thickness of the cover member 70 changes. In addition, since the thickness of the cover member 70 is not excessively large, it is possible to suppress an increase in size of the wound inductor component 10.

(1-6) According to the first embodiment, in a sectional view along the height direction Td including the central axial line CA of the wound inductor component 10, the third average distance D3 in the height direction Td from the upper end surface 61 of the wire 60 to the upper surface 71 of the cover member 70 is 85 μm. Therefore, the third average distance D3 is 50% or more of the second average distance D2. That is, the difference between the second average distance D2, which is the thickness of the portion of the cover member 70 covering the winding core 30, and the third average distance D3, which is the thickness of the portion covering the wire 60, is not excessively large. Therefore, regardless of the thermal expansion or contraction of the cover member 70, the difference in the amount of expansion or contraction between the portion covering the winding core 30 and the portion covering the wire 60 in the cover member 70 does not become excessively large. As a result, regardless of an excessive thermal shock applying to the cover member 70, it is possible to suppress occurrence of damage starting from a place where the thickness of the cover member 70 changes.

(1-7) According to the first embodiment, the corners of the flange 40 are chamfered. For example, a boundary portion between the upper end surface 41 of the first flange 40L and the both lateral surfaces 43 and a boundary portion between the upper end surface 41 of the first flange 40L and the outer surface 45 are chamfered. The thickness of the cover member 70 covering the chamfered boundary portions gradually changes according to the chamfered shape. By eliminating the portion where the thickness of the cover member 70 suddenly changes in this manner, it is possible to prevent the cover member 70 from being damaged due to a thermal shock.

(1-8) According to the first embodiment, since the upper surface 71 of the cover member 70 is a flat surface, for example, when the wound inductor component 10 is mounted on the substrate, the upper surface 71 of the cover member 70 is easily sucked and conveyed by a suction nozzle.

Second Embodiment

Hereinafter, a second embodiment of the wound inductor component will be described. In a wound inductor component 110 according to the second embodiment, the shape of a covered surface 146 of the flange 40 in the core 20 is mainly different from that of the first embodiment. In the following description, the same components as those of the first embodiment are denoted by the same reference numerals, and the description thereof will be omitted or simplified.

Figure 5:
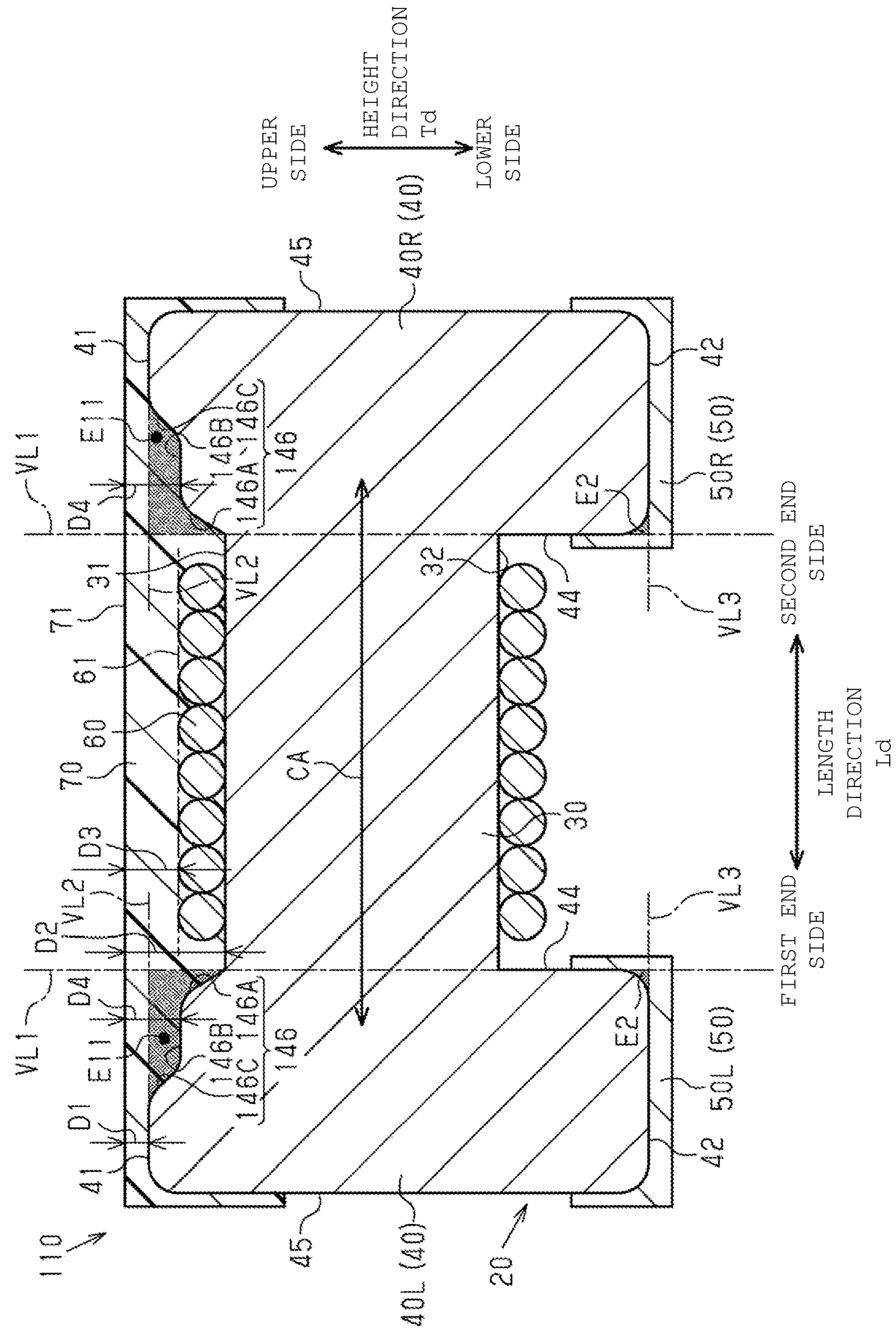
FIG. 5 is a sectional view of a wound inductor component according to a second embodiment.

As illustrated in FIG. 5, the covered surface 146 of the first flange 40L includes a first inclined surface 146A, a flat surface 146B, and a second inclined surface 146C.

In a sectional view along the height direction Td including the central axial line CA of the wound inductor component 110, the first inclined surface 146A is provided at an end of the covered surface 146 on the winding core 30 side in the length direction Ld. An end of the first inclined surface 146A on the winding core 30 side in the length direction Ld is connected to an end of the upper surface 31 of the winding core 30 on the first end side in the length direction Ld. The first inclined surface 146A extends so as to be inclined with respect to the upper surface 31 of the winding core 30 so as to be positioned on the upper side in the height direction Td toward the first end side in the length direction Ld. An end of the first inclined surface 146A on the first end side in the length direction Ld is located substantially at the center between the position of the upper surface 31 of the winding core 30 and the position of the upper end surface 41 of the first flange 40L in the height direction Td.

In a sectional view along the height direction Td including the central axial line CA, the flat surface 146B is connected to an end of the first inclined surface 146A on the first end side in the length direction Ld. The flat surface 146B extends in parallel with the length direction Ld in a sectional view along the height direction Td including the central axial line CA. The position of the flat surface 146B in the height direction Td is an intermediate position between the upper surface 31 of the winding core 30 and the upper end surface 41 of the first flange 40L. An end of the flat surface 146B on the first end side in the length direction Ld reaches substantially the center of the first flange 40L in the length direction Ld.

In a sectional view along the height direction Td including the central axial line CA, the second inclined surface 146C is connected to an end of the flat surface 146B on the first end side in the length direction Ld. The second inclined surface 146C extends so as to be inclined with respect to the upper surface 31 of the winding core 30 so as to be positioned on the upper side in the height direction Td toward the first end side in the length direction Ld. An end of the second inclined surface 146C on the first end side in the length direction Ld is connected to the upper end surface 41 of the first flange 40L.

As described above, in a sectional view along the height direction Td including the central axial line CA, the flat surface 146B extends between the first inclined surface 146A and the second inclined surface 146C on the covered surface 146 of the first flange 40L. Therefore, two steps are formed between the upper end surface 41 of the first flange 40L and the upper surface 31 of the winding core 30 with the flat surface 146B interposed therebetween.

In a sectional view along the height direction Td including the central axial line CA, a step distance D4 in the height direction Td from the flat surface 146B to the upper surface 71 of the cover member 70 is 105 μm. Therefore, the step distance D4 is twice or more of the first average distance D1 and less than the second average distance D2.

Here, it is assumed that the first virtual straight line VL1, the second virtual straight line VL2, and the third virtual straight line VL3 are drawn as in the first embodiment described above. At this time, the area of a first region E11 surrounded by the surfaces of the first virtual straight line VL1, the second virtual straight line VL2, and the first flange 40L is larger than the area of the second region E2 surrounded by the surfaces of the first virtual straight line VL1, the third virtual straight line VL3, and the first flange 40L.

Note that the shape of the covered surface 146 in the second embodiment is different from that in the first embodiment described above. As a result, the shape of the first region E11 in the second embodiment is different from the shape of the first region E1 in the first embodiment. In particular, the area of the first region E11 of the second embodiment is larger than that of the first region E1 of the first embodiment.

Next, functions and effects of the second embodiment will be described. According to the second embodiment, in addition to the effects of (1-1) to (1-8) described above, the following effects are further obtained.

(2-1) According to the second embodiment, the covered surface 146 of the first flange 40L includes the first inclined surface 146A, the flat surface 146B, and the second inclined surface 146C when viewed in a cross section along the height direction Td including the central axial line CA. Since the flat surface 146B includes in this manner, the thickness of the cover member 70 covering the flat surface 146B is larger than the thickness of the cover member 70 covering the upper end surface 41 of the first flange 40L, and is smaller than the thickness of the upper surface 31 of the winding core 30. Therefore, the degree of change in the thickness of the cover member 70 can be made gentler than when the upper end surface 41 of the first flange 40L and the upper surface 31 of the winding core 30 are connected by one inclined surface.

(2-2) According to the second embodiment, the step distance D4 is twice or more of the first average distance D1. Therefore, the thickness of the upper portion of the flat surface 146B is correspondingly larger than the thickness of the upper portion of the upper end surface 41 of the first flange 40L where the thickness of the cover member 70 is the smallest. Therefore, damage to the cover member 70 in the upper portion of the flat surface 146B due to an excessive thermal shock to the cover member 70 can be suppressed.

Each of the above embodiments can be modified as follows. Each embodiment and the following modifications can be implemented in combination within a range not technically contradictory.

In each of the above embodiments, other boundary portions may not be chamfered except for the boundary portion between the upper end surface 41 and the inner surface 44 among the corners of the flange 40. Note that the method of processing the corners of the core 20 into a chamfered shape is not limited, and a mold for molding the core 20 may have a chamfered shape, or the molded core 20 may be chamfered by barrel finishing.

In each of the above embodiments, the dimension of the core 20 is not limited to the example of the above embodiment. Regardless of the dimension of the core 20, damage to the cover member 70 can be suppressed as long as the area of the first region is larger than the area of the second region E2.

In each of the above embodiments, the material of the core 20 is not limited to the example of each of the above embodiments. For example, the material of the core 20 may be alumina or resin. The core 20 may be a resin molded body.

In each of the above embodiments, the shape of the winding core 30 may be a columnar shape, and may be a columnar shape or a polygonal columnar shape. At the boundary portion of the winding core 30 with the flange 40, the end portion of the winding core 30 may spread so as to be away from the central axial line CA as approaching the flange 40. In this case, the boundary between the winding core 30 and the flange 40 is the inner surface 44 orthogonal to the length direction Ld. When the flange 40 does not have a surface orthogonal to the length direction Ld, if there is a corner between the surface of the flange 40 and the surface of the winding core 30 in a sectional view including the central axial line CA, the corner is a boundary, and if there is an inflection point, the inflection point is a boundary.

In each of the above embodiments, the shape of the flange 40 may be spherical or polygonal columnar. That is, a part or the whole of the surface of the flange 40 may be formed of a curved surface. At least the flange 40 only needs to protrude to both sides of the winding core 30 in the height direction Td when viewed from the central axial line CA direction. The amount of protrusion of the flange 40 upward from the winding core 30 may be equal to or less than the amount of protrusion of the flange 40 downward from the winding core 30.

Figure 6:
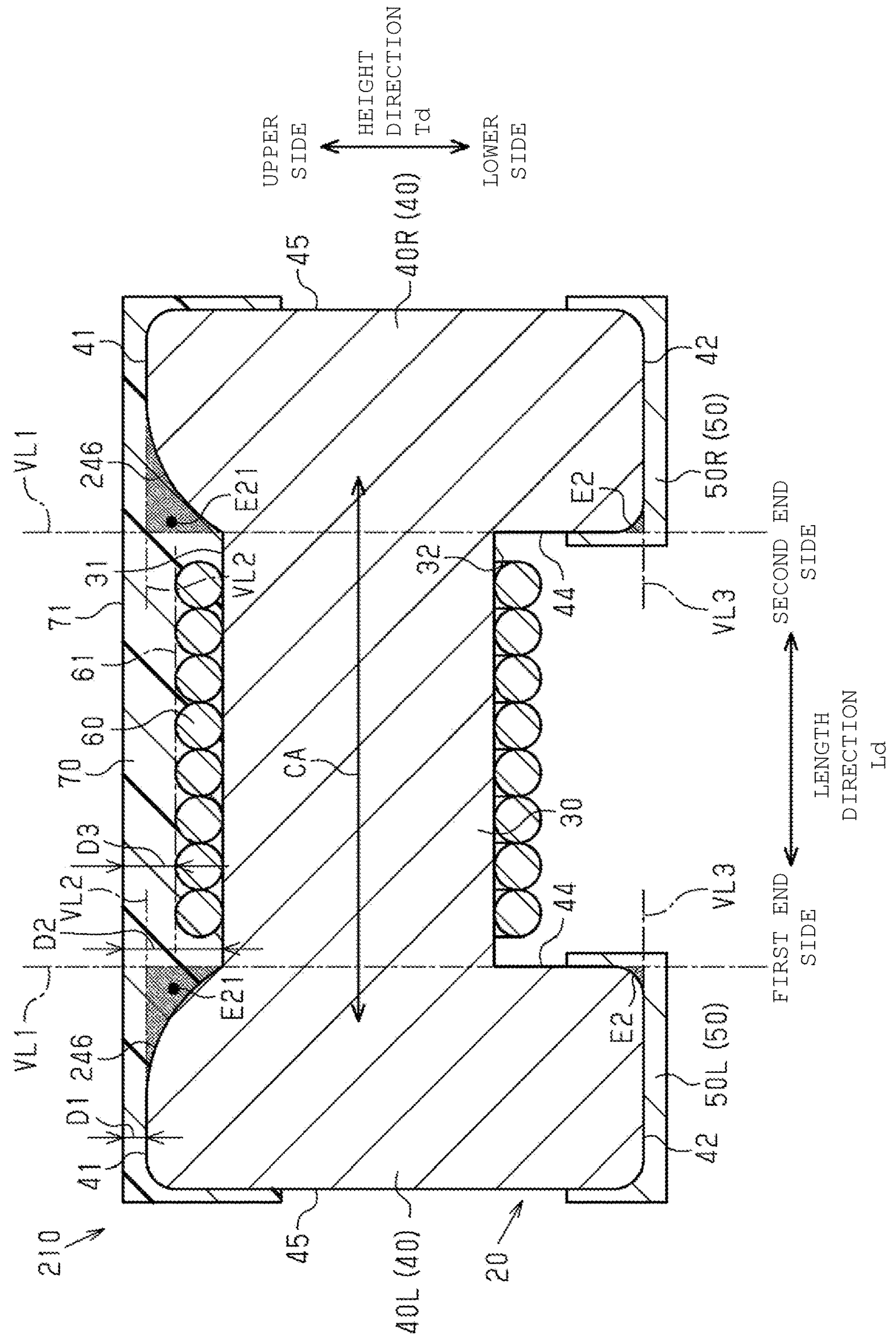
FIG. 6 is a sectional view of a wound inductor component according to a modification example.

In each of the above embodiments, the surface constituting the covered surface may not have a portion extending linearly in a sectional view. For example, the first inclined surface 146A and the second inclined surface 146C in the second embodiment may be curved surfaces. Further, in the modification illustrated in FIG. 6, the shape of the covered surface 246 is different from that of the first embodiment. The covered surfaces 246 of the wound inductor component 210 in the modification are all in an arc shape. That is, when viewed in a cross section including the central axial line CA and along the height direction Td, the covered surface 246 extends in an arc shape protruding inward in the length direction Ld and upward in the height direction Td, that is, obliquely inward. The area of the first region E21 is larger than the area of the second region E2, and in this case, the covered surface 246 can be formed by R processing. Note that the shape of the curve of the covered surface 246 is an example, and for example, the covered surface 246 may extend in an arc shape protruding outward in the length direction Ld and downward in the height direction Td, that is, obliquely outward and downward. For example, the covered surface may be a combination of a straight line and a curved line.

In each of the above embodiments, the area of the first region may be larger than the area of the second region E2, and the covered surface does not necessarily have an inclined surface.

In the second embodiment, three or more steps may be provided on the covered surface 146. In this case, the step distance per step in the height direction Td is preferably twice or more of the step distance of another step located above the step. More specifically, in this case, a plurality of flat surfaces are provided, and the other flat surface is located on the upper side and on the side opposite to the winding core 30 in the length direction Ld with respect to one flat surface. The step distance on one flat surface may be twice or more of the step distance on the other flat surface. In this case, the difference in thickness of the cover member 70 between the steps is reduced. Therefore, since the difference in thickness of the cover member 70 between the steps is increased, it is possible to suppress damage due to expansion and contraction of the cover member 70 when a thermal shock is applied to the cover member 70 in the upper portion of the step. In particular, it is preferable when the amount of protrusion of the flange 40 upward from the winding core 30 is larger than that in each of the above embodiments.

In each of the above embodiments, the first average distance D1 may be less than 20% or more than 45% of the second average distance D2. The first average distance D1 may be less than 40 μm or greater than 100 μm. Regardless of the size of the first average distance D1, damage to the cover member 70 can be prevented as long as the area of the first region is larger than the area of the second region E2. From the viewpoint of downsizing the wound inductor component, the first average distance D1 is preferably 45% or less of the second average distance D2, and in the present embodiment, is preferably 100 μm or less.

In each of the above embodiments, the position of the terminal electrode 50 is not limited to the example of the above embodiment. For example, the terminal electrode 50 may be disposed only on the lower end surface 42 of the flange 40.

In each of the above embodiments, the terminal electrode 50 may be formed by laminating a plurality of metal layers. For example, a layer of each metal of silver, copper, nickel, and tin may be sequentially laminated. In addition, the terminal electrode 50 may be formed by baking or plating a conductor, or may be formed by attaching a metal plate.

In each of the above embodiments, the dimension of the diameter of the wire 60 is not limited to the example of the above embodiment. The ratio of the third average distance D3 to the second average distance D2 also changes by changing the diameter dimension of the wire 60, but the ratio of the third average distance D3 to the second average distance D2 may be less than 50% or less than 85 μm. The diameter of the wire 60 is preferably 15 μm or more and 85 μm or less (i.e., from 15 μm to 85 μm).

In each of the above embodiments, the plurality of wires 60 may be wound around the winding core 30. In this case, the number of terminal electrodes 50 may be increased in accordance with the number of ends of the wire 60. In this case, the upper end surface 61 of the wire 60 is a surface connecting the upper ends of the wires 60 wound outermost.

In each of the above embodiments, the material of the cover member 70 is not limited to the acrylic resin. For example, the material of the cover member 70 may be a urethane-based resin, an epoxy-based resin, or a silicon-based resin. The elastic modulus of the cover member 70 is not limited to the example of the above embodiment. For example, since the material of the cover member 70 has an elastic modulus of 6 GPa or less, it is possible to prevent peeling at a portion where the core 20 and the cover member 70 are in contact with each other. In particular, since the material of the cover member 70 has an elastic modulus of 120 MPa or less, more reliability against peeling can be secured. Further, since the material of the cover member 70 has an elastic modulus of 0.5 MPa or more, it is possible to suppress the wound inductor components 10 from sticking to each other during conveyance and mounting of the wound inductor components 10.

In each of the above embodiments, the cover member 70 may not cover the entire upper side of the core 20 and the wire 60. At least the portion from the upper end of the first flange 40L to the upper end of the winding core 30 may be covered. When the third average distance D3 is less than 50% of the second average distance D2 or less than 85 μm, the cover member 70 may not cover the upper end of the wire 60 from above.

What is claimed is:

1. A wound inductor component comprising:

a columnar winding core;

a first flange and a second flange respectively connected to both ends of the winding core in a central axial line direction of the winding core, the first and second flanges each protruding from both of opposite sides of the winding core along a first line direction that is orthogonal to the central axial line direction of the winding core and orthogonal to a mounting surface at the time of mounting, when the central axial line is defined as a line through which a center of the winding core passes in an extending direction of the winding core, and the central axial line direction is defined as a direction in which the central axial line extends;

a wire wound around the winding core; and a cover member covering, from one side of the sides of the winding core in the first line direction, a portion from a farthest end of one side of the first flange in the first line direction to a farthest end on one side of the winding core in the first line direction, wherein when viewed in a cross section including the central axial line and along the first line direction, when a first region is defined as a region surrounded by a first straight line extending in the first line direction and passing through a boundary between the first flange and the winding core, a second straight line parallel to the central axial line and passing through the farthest end of one side of the first flange in the first line direction, and a first portion of an inner surface of the first flange, and a second region is defined as a region surrounded by a third straight line extending in the first line direction and passing through the boundary between the first flange and the winding core, a fourth straight line parallel to the central axial line and passing through a farthest end of an other side of the first flange, opposite to the one side of the first flange, in the first line direction, and a second portion of the inner surface of the first flange, an area of the first region is larger than an area of the second region, the first portion of the inner surface of the first flange extending from the farthest end of one side of the first flange in the first line direction to the winding core is defined as a covered surface, and when viewed in a cross section including the central axial line and along the first line direction, the covered surface includes a first inclined surface and a second inclined surface that are inclined away from the central axial line as going outward in the central axial line direction, and a flat surface that is located between the first inclined surface and the second inclined surface in the central axial line direction and extends in the central axial line direction.

2. The wound inductor component according to claim 1, wherein the first portion of the inner surface of the first flange extending from the farthest end of one side of the first flange in the first line direction to the winding core is defined as a covered surface, and when viewed in a cross section including the central axial line and along the first direction, at least a certain range of the covered surface from an end on the winding core side extends linearly inclined with respect to both the first direction and the central axial line.

3. The wound inductor component according to claim 1, wherein the first portion of the inner surface of the first flange extending from the farthest end of one side of the first flange in the first line direction to the winding core is defined as a covered surface, and when viewed in a cross section including the central axial line and along the first direction, at least a certain range of the covered surface from an end on the winding core side extends in an arc shape.

4. The wound inductor component according to claim 1, wherein when viewed in a cross section including the central axial line and along the first line direction, and when a first average distance is defined as an average distance in the first line direction from the farthest end on one side of the first flange in the first line direction to a surface of the cover member on the one side of the first flange in the first line direction, a second average distance is defined as an average distance in the first line direction from an end on one side of the winding core in the first line direction to the surface of the cover member on the one side of the winding core in the first line direction, and a step distance is defined as an average distance in the first line direction from the flat surface to the surface of the cover member on the one side of the winding core in the first line direction, the step distance is twice or more of the first average distance and less than the second average distance.

5. The wound inductor component according to claim 1, wherein when a direction orthogonal to both the central axial line direction and the first line direction is a second direction, the first flange has an end surface on the one side of the first flange in the first line direction and lateral surfaces on both sides in the second direction, a boundary portion between the end surface and the lateral surfaces has a chamfered shape, and the boundary portion is covered with the cover member.

6. The wound inductor component according to claim 1, wherein an elastic modulus of the cover member is 120 MPa or less.

7. The wound inductor component according to claim 2, wherein when a direction orthogonal to both the central axial line direction and the first line direction is a second direction, the first flange has an end surface on the one side of the first flange in the first line direction and lateral surfaces on both sides in the second direction, a boundary portion between the end surface and the lateral surfaces has a chamfered shape, and the boundary portion is covered with the cover member.

8. The wound inductor component according to claim 3, wherein when a direction orthogonal to both the central axial line direction and the first line direction is a second direction, the first flange has an end surface on the one side of the first flange in the first line direction and lateral surfaces on both sides in the second direction, a boundary portion between the end surface and the lateral surfaces has a chamfered shape, and the boundary portion is covered with the cover member.

9. The wound inductor component according to claim 4, wherein when a direction orthogonal to both the central axial line direction and the first line direction is a second direction, the first flange has an end surface on the one side of the first flange in the first line direction and lateral surfaces on both sides in the second direction, a boundary portion between the end surface and the lateral surfaces has a chamfered shape, and the boundary portion is covered with the cover member.

10. The wound inductor component according to claim 2, wherein an elastic modulus of the cover member is 120 MPa or less.

11. The wound inductor component according to claim 3, wherein an elastic modulus of the cover member is 120 MPa or less.

12. The wound inductor component according to claim 4, wherein an elastic modulus of the cover member is 120 MPa or less.

13. The wound inductor component according to claim 5, wherein an elastic modulus of the cover member is 120 MPa or less.

14. The wound inductor component according to claim 7, wherein an elastic modulus of the cover member is 120 MPa or less.

15. The wound inductor component according to claim 8, wherein an elastic modulus of the cover member is 120 MPa or less.

16. The wound inductor component according to claim 9, wherein an elastic modulus of the cover member is 120 MPa or less.

* * * * *